US012683034B2

(12) United States Patent

Hejzlar et al.

(10) Patent No.: US 12,683,034 B2

(45) Date of Patent: Jul. 14, 2026

(54) PASSIVE HEAT REMOVAL SYSTEM FOR NUCLEAR REACTORS

(71) Applicant: TerraPower, LLC, Bellevue, WA (US)

(72) Inventors: Pavel Hejzlar, Kirkland, WA (US); Peter McNabb, Bellevue, WA (US)

(73) Assignee: TERRAPOWER, LLC, Bellevue, WA (US)

( * ) Notice: Subject to any disclaimer, the term of this patent is extended or adjusted under 35 U.S.C. 154(b) by 0 days.

(21) Appl. No.: 18/471,871

(22) Filed: Sep. 21, 2023

(65) Prior Publication Data

US 2024/0013940 A1 Jan. 11, 2024

Related U.S. Application Data

(63) Continuation of application No. 17/159,743, filed on Jan. 27, 2021, now Pat. No. 11,798,697.

(Continued)

(51) Int. Cl.
| | |
|---|---|
| *G21C 15/18* | (2006.01) |
| *F04B 17/03* | (2006.01) |
| *F04B 19/04* | (2006.01) |
| *G21C 5/10* | (2006.01) |
| *G21C 13/024* | (2006.01) |

(Continued)

(52) U.S. Cl.
CPC .............. *G21C 21/00* (2013.01); *F04B 17/03* (2013.01); *F04B 19/04* (2013.01); *G21C 5/10* (2013.01); *G21C 13/024* (2013.01); *G21C 13/04* (2013.01); *H02K 44/06* (2013.01); *G21C 1/326* (2013.01); *G21C 3/33* (2013.01); *G21C 9/00* (2013.01);

(Continued)

(58) Field of Classification Search
None
See application file for complete search history.

(56) References Cited

U.S. PATENT DOCUMENTS

| | | | |
|---|---|---|---|
| 2,702,004 | A | 2/1955 | Blake et al. |
| 2,730,951 | A | 1/1956 | Donelian et al. |

(Continued)

FOREIGN PATENT DOCUMENTS

| | | | |
|---|---|---|---|
| CN | 103280247 A | * | 9/2013 |
| CN | 107689255 A | | 2/2018 |

(Continued)

OTHER PUBLICATIONS

LV—Scaling Analysis for the Direct Reactor Auxiliary Cooling System for FHRs, Nuclear Engineering and Design 285 (2015) 197-206, 10 pages.

(Continued)

*Primary Examiner* — Lily C Garner

(74) *Attorney, Agent, or Firm* — FisherBroyles, LLP; Jeremy P. Sanders

(57) ABSTRACT

A nuclear reactor is configured with an intermediate coolant loop for transferring thermal energy from the reactor core for a useful purpose. The intermediate coolant loop includes a bypass flowpath with an air heat exchanger for dumping reactor heat during startup and/or shutdown. A fluidic diode along the bypass flowpath asymmetrically restricts flow across the bypass flowpath, inhibiting flow in a first flow direction during a full power operating condition and allowing a relatively uninhibited flow in a second direction during a startup and/or shut down low power operating condition.

20 Claims, 4 Drawing Sheets

Related U.S. Application Data

(60) Provisional application No. 63/066,785, filed on Aug. 17, 2020.

(51) Int. Cl.

| | |
|---|---|
| *G21C 13/04* | (2006.01) |
| *G21C 21/00* | (2006.01) |
| *H02K 44/06* | (2006.01) |
| *G21C 1/32* | (2006.01) |
| *G21C 3/33* | (2006.01) |
| *G21C 9/00* | (2006.01) |
| *G21C 9/04* | (2006.01) |
| *G21C 15/12* | (2006.01) |

(52) U.S. Cl.
CPC .............. *G21C 9/04* (2013.01); *G21C 15/12* (2013.01); *G21C 15/185* (2019.01)

(56) References Cited

U.S. PATENT DOCUMENTS

| | | | | |
|---|---|---|---|---|
| 3,285,823 | A | 11/1966 | McDaniel et al. | |
| 3,715,270 | A | 2/1973 | Jackson | |
| 3,995,918 | A | 12/1976 | Mahe et al. | |
| 4,050,986 | A | 9/1977 | Ference et al. | |
| 4,096,034 | A | 6/1978 | Anthony | |
| 4,187,874 | A * | 2/1980 | Essebaggers | F16K 15/042 |
| | | | | 137/512.1 |
| 4,198,271 | A | 4/1980 | Seed et al. | |
| 4,219,385 | A | 8/1980 | Guidez et al. | |
| 4,449,890 | A | 5/1984 | Barzantny et al. | |
| 4,508,677 | A | 4/1985 | Craig et al. | |
| 4,508,678 | A | 4/1985 | Costes | |
| 4,581,199 | A | 4/1986 | Bioret et al. | |
| 4,645,638 | A | 2/1987 | Burelbach et al. | |
| 4,668,170 | A | 5/1987 | Barzantny et al. | |
| 4,773,826 | A | 9/1988 | Mole | |
| 4,802,531 | A | 2/1989 | Nathenson et al. | |
| 4,808,080 | A | 2/1989 | Alexion et al. | |
| 4,818,185 | A | 4/1989 | Alexeff | |
| 5,094,803 | A | 3/1992 | Nishiguchi | |
| 5,180,543 | A | 1/1993 | Conway et al. | |
| 5,202,083 | A * | 4/1993 | Spinks | G21C 15/18 |
| | | | | 376/299 |
| 5,303,275 | A * | 4/1994 | Kobsa | G21C 15/24 |
| | | | | 376/281 |
| 5,586,156 | A | 12/1996 | Gaubatz | |
| 5,610,958 | A | 3/1997 | Shimano et al. | |
| 5,790,619 | A | 8/1998 | Peck | |
| 6,534,946 | B2 | 3/2003 | Lelkes et al. | |
| 8,480,377 | B2 | 7/2013 | Ciocanel et al. | |
| 9,478,318 | B2 * | 10/2016 | Kwon | G21D 1/02 |
| 9,799,417 | B2 * | 10/2017 | Hyde | G21D 7/04 |
| 9,881,703 | B2 | 1/2018 | Liszkai et al. | |
| 10,276,270 | B2 * | 4/2019 | Kim | G21C 1/328 |
| 10,319,482 | B2 | 6/2019 | Hara et al. | |
| 10,720,248 | B2 * | 7/2020 | Malloy, III | G21C 1/32 |
| 10,726,960 | B2 * | 7/2020 | Ireland | G21D 3/06 |
| 10,741,293 | B2 | 8/2020 | Abbott et al. | |
| 11,276,503 | B2 | 3/2022 | Cisneros et al. | |
| 11,978,565 | B2 * | 5/2024 | Loewen | F15D 1/02 |
| 12,224,642 | B2 | 2/2025 | Corbin et al. | |
| 2002/0075983 | A1 * | 6/2002 | Nishiguchi | G21C 1/02 |
| | | | | 376/220 |
| 2010/0226471 | A1 * | 9/2010 | Cinotti | F28F 1/003 |
| | | | | 376/299 |
| 2011/0037325 | A1 | 2/2011 | Ciocanel et al. | |
| 2011/0110484 | A1 | 5/2011 | Ahlfeld et al. | |
| 2012/0099694 | A1 | 4/2012 | Inatomi et al. | |
| 2013/0202075 | A1 * | 8/2013 | Kwon | G21D 1/02 |
| | | | | 376/298 |
| 2014/0226775 | A1 | 8/2014 | Devolpi | |
| 2015/0357061 | A1 | 12/2015 | Ales et al. | |
| 2016/0189805 | A1 | 6/2016 | Cheatham, III | |

| | | | |
|---|---|---|---|
| 2016/0273540 | A1 | 9/2016 | Mauvais et al. |
| 2017/0162283 | A1 | 6/2017 | Loewen et al. |
| 2019/0189296 | A1 | 6/2019 | Cinotti |
| 2019/0237205 | A1 | 8/2019 | Abbott et al. |
| 2020/0279660 | A1 | 9/2020 | Abbott et al. |

FOREIGN PATENT DOCUMENTS

| | | | | |
|---|---|---|---|---|
| EP | 0118016 | A1 | 9/1984 | |
| EP | 0514272 | A1 | 11/1992 | |
| FR | 2388376 | A1 | 11/1978 | |
| GB | 1423069 | A * | 1/1976 | .............. G21C 1/02 |
| GB | 2104710 | A * | 3/1983 | .............. G21C 1/03 |
| JP | S5274797 | A | 6/1977 | |
| JP | S5559400 | A | 5/1980 | |
| JP | 57125896 | | * 8/1982 | |
| JP | S58201089 | A | 11/1983 | |
| JP | S592600 | A | 1/1984 | |
| JP | S59176696 | A | 10/1984 | |
| JP | S60151591 | A | 8/1985 | |
| JP | S61108995 | A | 5/1986 | |
| JP | H0235397 | A | 2/1990 | |
| JP | H0373891 | B2 | 11/1991 | |
| JP | H0499995 | A | 3/1992 | |
| JP | H0571492 | A | 3/1993 | |
| JP | H05284796 | A | 10/1993 | |
| JP | H0740076 | B2 | 5/1995 | |
| JP | H10332883 | A | 12/1998 | |
| JP | 3697273 | B2 | 9/2005 | |
| JP | 2009250886 | A | 10/2009 | |
| KR | 20140105920 | A | 9/2014 | |
| KR | 101553888 | B1 | 9/2015 | |
| KR | 102201840 | B1 | 1/2021 | |
| WO | 2015115930 | A1 | 8/2015 | |
| WO | 2020036361 | A1 | 2/2020 | |

OTHER PUBLICATIONS

Wang—Thermal Hydraulics Analysis of the Advanced High Temperature Reactor, Nuclear Engineering and Design 294 (2015) 73-85, 13 pages.

Aizawa K., et al., "Electromagnetic Pumps for Main Cooling Systems of Commercialized Sodium-Cooled Fast Reactor," Journal of Nuclear Science and Technology, Mar. 2011, vol. 48, No. 3, pp. 344-352 (10 Pages), DOI: 10.1080/18811248.2011.9711709.

Dsouza B., "Neutronic Analysis of Light Water Small Modular Reactor with Flexible Fuel Configurations," Masters Theses, Missouri University of Science and Technology, 2015, 88 Pages.

International Preliminary Report on Patentability for International Application No. PCT/US2021/020961, dated Mar. 2, 2023, 9 Pages.

International Preliminary Report on Patentability for International Application No. PCT/US2021/022017, dated Mar. 2, 2023, 10 Pages.

International Preliminary Report on Patentability for International Application No. PCT/US2021/025477, dated Mar. 2, 2023, 10 Pages.

International Preliminary Report on Patentability for International Application No. PCT/US2021/026073, dated Mar. 2, 2023, 8 Pages.

International Search Report and Written Opinion for International Application No. PCT/US2021/020961, dated Jun. 17, 2021, 11 Pages.

International Search Report and Written Opinion for International Application No. PCT/US2021/022017, dated Aug. 3, 2021, 12 Pages.

International Search Report and Written Opinion for International Application No. PCT/US2021/025477, dated Aug. 5, 2021, 12 Pages.

International Search Report and Written Opinion for International Application No. PCT/US2021/026073, dated Aug. 5, 2021, 11 Pages.

Ware A.G., "Pressurized Water Reactor Control Rod Drive Mechanisms and Reactor Internals," Residual Life Assessment of Major Light Water Reactor, Nov. 1989, vol. 2, pp. 105-142 (39 Pages).

Zohuri B., "Small Modular Reactors and Innovative Efficient Enhancement Design," Heat Pipe Applications in Fission Driven Nuclear

(56)          References Cited

OTHER PUBLICATIONS

Power Plants, Department of Electrical and Computer Engineering,
Springer Nature Switzerland AG 2019, pp. 39-85 (49 Pages).

\* cited by examiner

PASSIVE HEAT REMOVAL SYSTEM FOR NUCLEAR REACTORS

CROSS-REFERENCE TO RELATED APPLICATIONS

This application is a continuation of U.S. patent application Ser. No. 17/159,743, filed Jan. 27, 2021, which claims the benefit of U.S. Provisional Patent Application No. 63/066,785, filed Aug. 17, 2020, both entitled "PASSIVE HEAT REMOVAL SYSTEM FOR NUCLEAR REACTORS," the contents of each is incorporated herein by reference in its entirety.

BACKGROUND

Most nuclear reactors have a core within which fuel elements and control elements are supported in different interrelated arrangements to support a critical reactivity to control the output of the reactor. Coolant is typically forced through passages between fuel elements and control elements to transfer heat generated by fissioning fuel elements to a heat exchanger to be used for useful purposes.

When a reactor is shut down, such as by inserting control elements into the reactor core to reduce the reactivity, the fission products continue to generate heat as they experience radioactive decay. In some cases, the decay heat power level is initially about 6-7% of the core output power prior to shutdown, which can result is a significant amount of heat that must be dealt with upon reactor shutdown.

A residual heat removal system is a standard safety system designed to deal with decay heat from a reactor that has shut down, and may include emergency generators to drive circulation pumps, passive heat removal systems, and other type of heat removal systems. Without a proper functioning decay heat removal system, the residual heat can cause catastrophic failures within the reactor systems.

Some reactors utilize a direct reactor auxiliary cooling system (DRACS) or a reactor vessel auxiliary cooling system (RVACS), to deal with residual heat and these systems are primarily safety systems relied upon for dumping decay heat after a reactor shutdown.

It would be an improvement in the art to use a passive heat removal system that not only aids in removing residual decay heat in a passive system, but also functions to remove heat from the reactor during startup procedures. It would be a further advantage if such a system was not classified as a safety system and therefore had the requirement to be designed and built to safety grade standards, but rather, was a commercial first line of defense in addition to such a safety system.

SUMMARY

According to some embodiments, a passive heat removal system functions to allow decay heat removal, both during startup and during shutdown of a nuclear reactor by allowing both forced and natural circulation between a hot leg and a cold leg of a heat exchanger situated within the intermediate fluid loop. The natural circulation of fluid is promoted, by relying on gravity to cause the higher density cold fluid to fall and the lower density heated fluid to rise, causing natural circulation through the intermediate coolant loop through a heat exchanger. In some cases, a preferential flow regulator causes a high pressure drop in a first flow direction and a low pressure drop in a second flow direction.

According to some embodiments, a sodium-cooled nuclear reactor includes a reactor vessel; a reactor core within the reactor vessel; a primary heat exchanger within the reactor vessel; an intermediate coolant loop configured to circulate intermediate coolant through the primary heat exchanger, the intermediate coolant loop having a hot leg and a cold leg through which intermediate coolant flows; a pump in fluid communication with the intermediate coolant loop and configured to circulate intermediate coolant through the intermediate coolant loop; an air heat exchanger disposed along a bypass flowpath between the hot leg and the cold leg of the intermediate coolant loop; and a fluidic diode disposed along the bypass flowpath between to asymmetrically restrict fluid flow along the bypass flowpath.

In some cases, the fluidic diode is disposed outside the reactor vessel. The fluidic diode may provide a flow resistance against the pump circulating the intermediate coolant across the bypass flowpath. That is, when the pump operates, the fluidic diode provides a resistance to the intermediate coolant from flowing along the bypass flowpath from the cold leg to the hot leg.

The fluidic diode may allow relatively unrestricted fluid flow across the bypass flowpath when the pump is not operating. In other words, when the pump is not operating, natural circulation will cause the intermediate fluid to flow through the fluidic diode from the hot leg to the cold leg with very little flow resistance.

In some instances, the air heat exchanger dumps reactor output heat during a low-power startup operating condition. For example, the air heat exchanger may dump reactor output heat during a low-power shutdown operating condition, such as when the reactor output drops below about 20% power, or 15% power, or 10% power, or less.

In some examples, the intermediate coolant is liquid sodium, while in other examples, the intermediate coolant is molten salt. Of course, other intermediate coolants are contemplated and can be used with the disclosed system and configurations.

In some embodiments, a bypass flow pump may be configured to cause intermediate coolant to flow along the bypass flowpath. In some cases, the bypass flow pump is omitted, and natural circulation causes the intermediate coolant to flow along the bypass flowpath.

According to some embodiments, a method of operating a nuclear reactor having an intermediate coolant loop includes generating heat in a reactor core of a nuclear reactor; causing primary coolant to flow within the nuclear reactor through a primary heat exchanger; causing an intermediate coolant to flow through an intermediate coolant loop and through the primary heat exchanger; causing the intermediate coolant to flow through a bypass flowpath; and dumping heat, during a period of low reactor power, from an air heat exchanger disposed along the bypass flowpath in the intermediate coolant loop.

In some examples, the method includes continuing to dump heat from the air heat exchanger disposed along the bypass flowpath until the nuclear reactor reaches a target threshold power output. In other words, a portion of the intermediate coolant may be diverted away from the bypass flowpath as the nuclear reactor exceeds the target threshold power output.

In some embodiments, causing the intermediate coolant to flow through a bypass flowpath further includes causing the intermediate coolant to flow through a fluidic diode in fluid communication with the bypass flowpath.

In some instances, the period of low reactor power is less than about 5% reactor power, or less than about 10% of the reactor power, or less than about 20% reactor power. In some instances, the intermediate coolant is caused to dump heat through the air heat exchanger during startup of a nuclear reactor. In some instances, the intermediate coolant is caused to dump heat through the air heat exchanger during shutdown of a nuclear reactor.

In some embodiments, causing the intermediate coolant to flow comprises causing sodium or salt to flow through the intermediate cooling loop. Other suitable coolants may be utilized in the alternative depending on the reactor configuration and the intermediate loop configuration.

DETAILED DESCRIPTION

This disclosure generally relates to a passive apparatus and arrangement for decay heat removal from a nuclear reactor during shutdown and/or startup, and include a passive system that can operate through principals of natural circulation.

Figure 1:
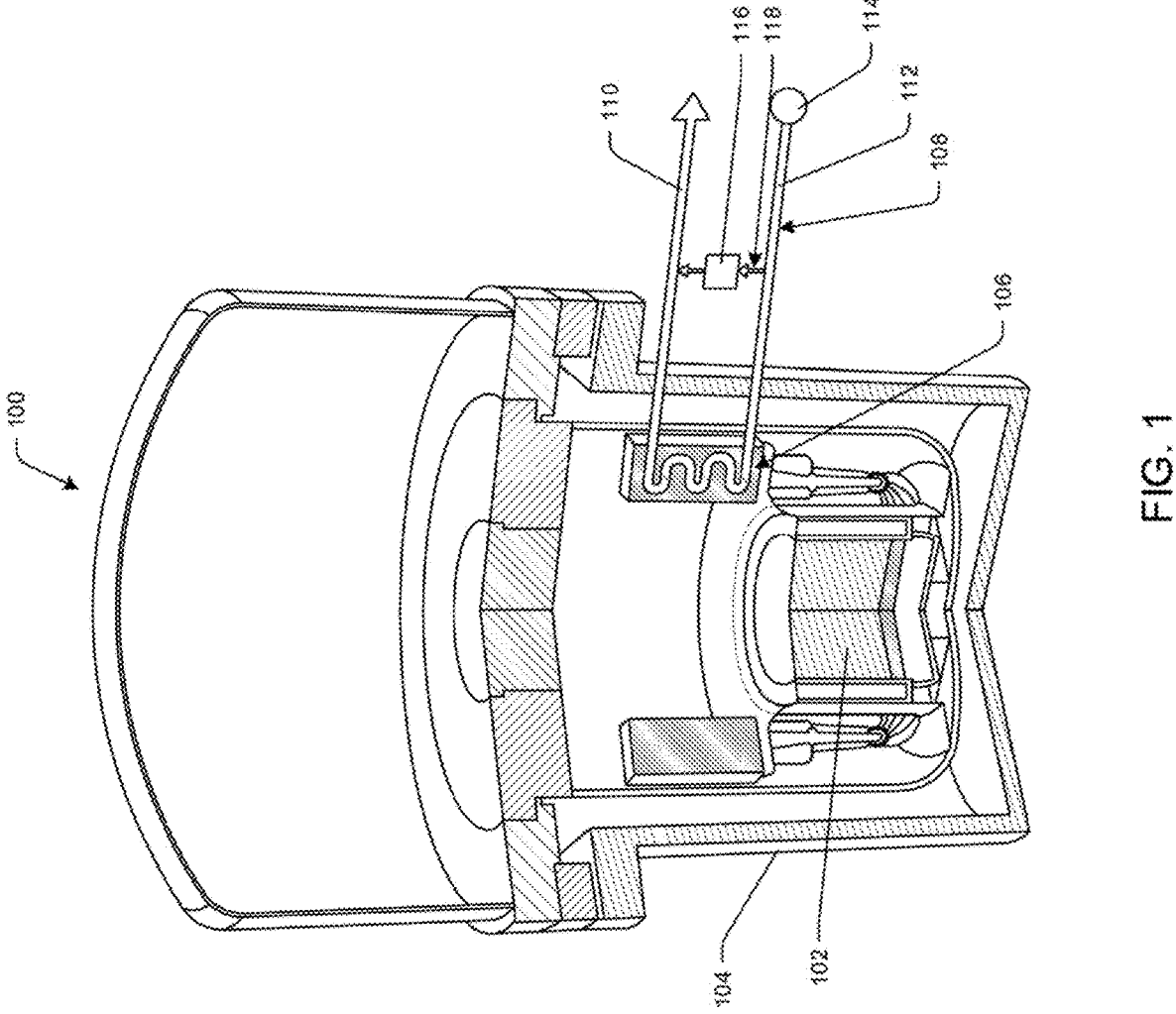
FIG. 1 is a schematic representation of a nuclear reactor intermediate coolant loop in a steady state operating condition, in accordance with some embodiments.

FIG. 1 illustrates a nuclear reactor intermediate coolant loop in a steady state operating condition. A nuclear reactor 100 of any suitable design, will typically include a core within a reactor vessel 104. The core will typically contain fuel that generates heat through a fissioning process. A primary coolant, which may be any suitable coolant, is forced through the core 102 to extract heat from the fissioning fuel. After the primary coolant passes through the core, it is routed to a primary heat exchanger 106 where it transfers thermal energy to an intermediate coolant flowing in an intermediate coolant loop 108.

In the illustrated embodiment, the primary coolant within the reactor vessel may be any suitable coolant, and in some examples is a liquid metal, such as sodium. The intermediate coolant within the intermediate coolant loop 108 may likewise be any suitable coolant, but in some cases is sodium. In some examples, the intermediate coolant within the intermediate coolant loop 108 is a salt.

The intermediate coolant loop 108, in many cases, is a closed fluid loop that includes a hot leg 110, a cold leg 112, and a pump 114. During normal use, the pump 114 pressurizes the intermediate coolant and causes the coolant within the cold log 108 to flow into the primary heat exchanger 106 and received thermal energy from the primary coolant within the reactor 100. The intermediate coolant exits the primary heat exchanger 106 through the hot leg 110 and is transported to another system where the thermal energy is used for a useful purpose. In some embodiments, the thermal energy transferred by the intermediate coolant loop 108 is used to store thermal energy, create steam, or is provided for other purposes.

In some embodiments, an air heat exchanger 116 is provided between the hot leg 110 and the cold leg 112 along a bypass flowpath 118. In some instances, the air heat exchanger 116 is elevated, and the force of gravity inhibits bypass flow from the cold leg 112 directly to the hot leg 110. Bypass flow tends to reduce the temperature of the intermediate coolant in the hot leg 110 and thus reduces the thermal energy available for useful purposes downstream of the bypass flow path 118.

During normal operation of the nuclear reactor 100, the pump 114 pressurizes the fluid in the intermediate coolant loop 108 to cause the intermediate coolant to flow through the primary heat exchanger 106. Because the intermediate coolant loop is pressurized, there is an opportunity for the intermediate coolant to flow along the bypass fluid path 118 in parallel with the flowpath through the primary heat exchanger 106. In some cases, this is an unwanted situation because the bypass flowpath results in mixing of the cold leg with the hot leg and thus reduces the thermal energy of the intermediate coolant in the hot leg. Elevating the air heat exchanger 116 may alleviate some of the bypass flow due to the forces of gravity imparting a flow resistance along the bypass flowpath 118.

Figure 2:
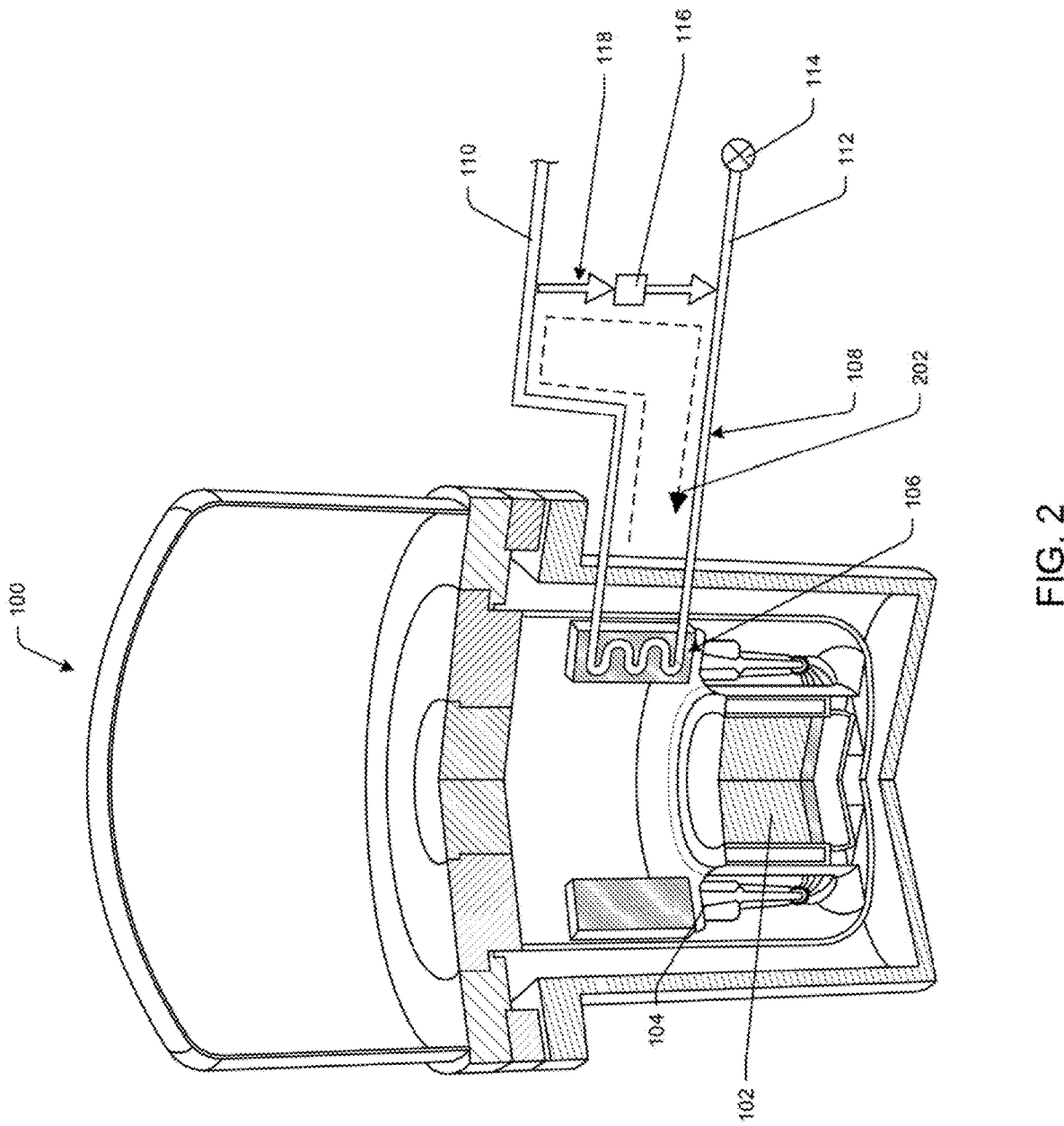
FIG. 2 illustrates a schematic representation of a nuclear reactor intermediate coolant loop in a natural circulation operating condition, in accordance with some embodiments.

FIG. 2 illustrates a nuclear reactor intermediate coolant loop 108 in a reactor shutdown configuration. As illustrated, the pump 114 may be devoid of power and therefore not pressurizing the intermediate coolant loop 108 to circulate the intermediate coolant. The intermediate coolant may continue to flow through natural circulation, such as in a direction indicated by arrow 202. In the event of a reactor shutdown, the decay heat from the reactor core needs to be dealt with, and is typically dealt with by a residual heat removal system, which may be any of a number of suitable safety systems configured to dump residual heat away from the reactor core. As illustrated, where the pump 114 is not energized and providing a pumping force, the fluid in the hot leg 110 and the cold leg 112 of the intermediate coolant lop 108 may become stagnant and therefore not carry thermal energy away from the reactor core, as intended. The air heat exchanger 116 may continue to allow natural circulation flow that provides a fluid pathway for the intermediate coolant that allows the fluid in the hot leg 110 to flow through the air heat exchanger 116 and to the cold leg 112 and circulate to continue to provide heat removal from the reactor core 102, even in the absence of pumping power. Of course, a pump, such as bypass flow pump 119 (FIG. 4), may be provided, such as along the bypass flowpath 118 to provide forced circulation of the intermediate coolant fluid from the primary heat exchanger 106 to the air heat exchanger 116 to allow decay heat to be dumped to the ambient air. The illustrated embodiment is schematically represented, and in many cases, the air heat exchanger 116 may be elevated, thus providing natural circulation by relying on gravity to cause the higher density cold fluid to fall and the lower density heated fluid to rise, causing natural circulation through the intermediate coolant loop through the air heat exchanger 116.

In many instances, the bypass flowpath 118 is accessed automatically, even in the absence of power, and does not require any modifications to the fluid path to cause the intermediate coolant to flow through the air heat exchanger 116. For example, the hot leg 110 and the cold leg 112 may provide sufficient flow friction that the bypass flowpath 118 becomes the path of least resistance for the fluid flow. In this case, the intermediate coolant with flow from the primary heat exchanger 106, thus withdrawing heat from the reactor core 102, along the hot leg 110 to the air heat exchanger 116, to the cold leg 112, and back to the primary heat exchanger 106, thus receiving thermal energy from the reactor core 102 and dumping it to the ambient air at the air heat exchanger 116.

In some embodiments, there may be a pump, such as bypass flow pump 119 (FIG. 4), provided along the bypass flowpath 118 to further encourage the dumping of decay heat. While the air heat exchanger 116 may be elevated to provide resistance to bypass flow of intermediate fluid from the cold leg 112 to the hot leg 110, in some embodiments, additional resistance to bypass flow may be introduced to further reduce the likelihood of bypass flow.

Figure 3:
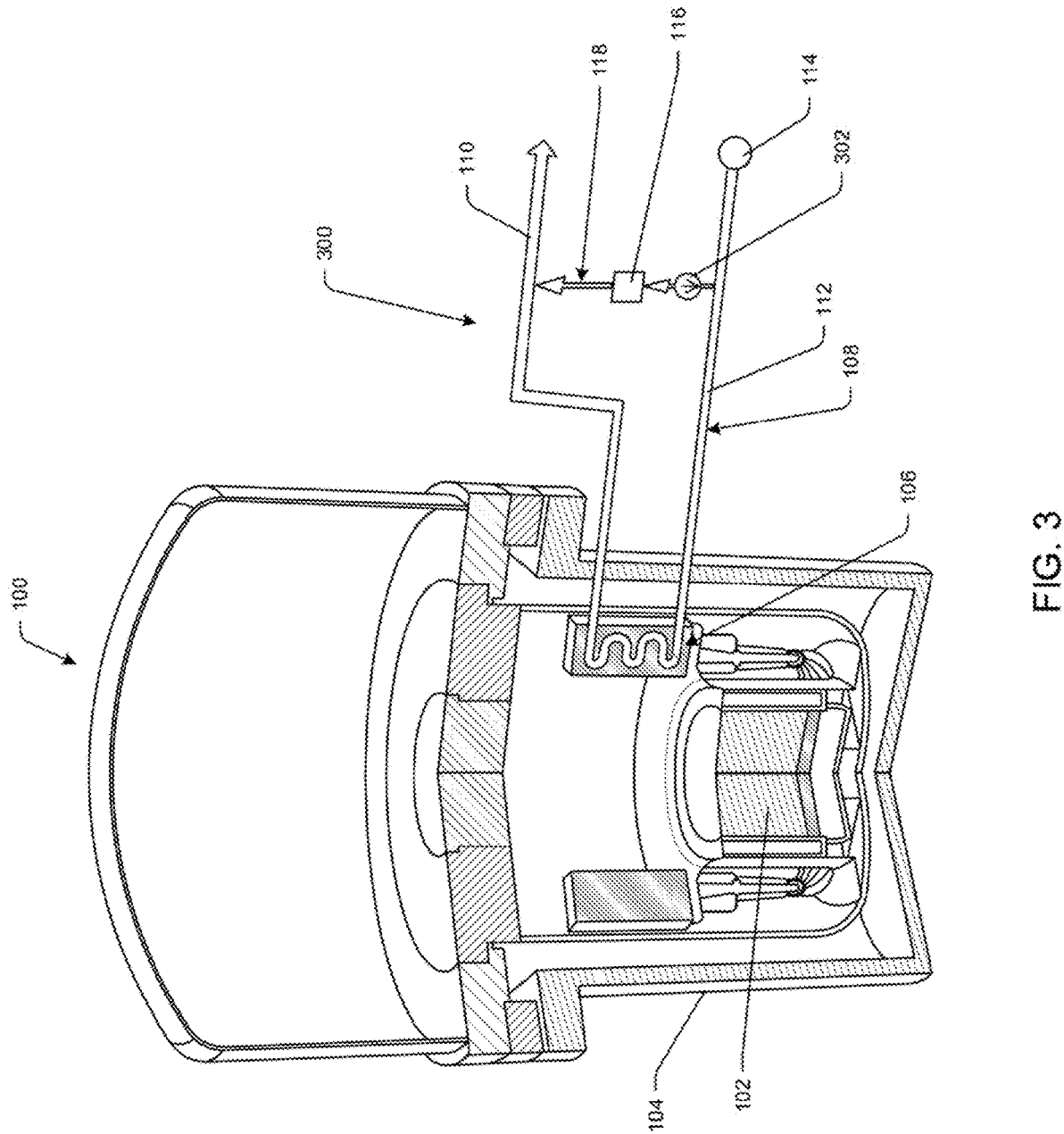
FIG. 3 illustrates a schematic representation of a nuclear reactor intermediate coolant loop incorporating a fluidic diode in a steady state operating condition, in accordance with some embodiments.

FIG. 3 illustrates a nuclear reactor intermediate coolant loop 300 with a fluidic diode 302 incorporated into the bypass flowpath 118 to provide preferential flow resistance. During normal full power operation of the nuclear reactor 100, the pump 114 will circulate intermediate fluid through the intermediate coolant loop 108. A fluidic diode 302 may be provided in the bypass flowpath 118, such as between the cold leg 112 and the air heat exchanger 116 and be configured to present an increased flow resistance to inhibit intermediate coolant from entering the air heat exchanger 116 from the cold leg 112.

A fluidic diode 302 is a device that presents increased flow resistance and therefore limits the fluid flow in one direction, while providing for a lower resistance to fluid flow in a second direction. A check valve could be used for such a configuration. A check valve typically has a moveable component, such as a sealing member, that is moveable between an open and a closed position, where the sealing member is biased in a closed position in response to fluid flow in a first direction, and biased in an open position in response to fluid flow in a second direction. However, check valves may be complex, unreliable, and in some cases, can be fouled or stuck in either an open or closed configuration. Accordingly, a fluidic diode 302 can provide many of the same benefits without the complexity or likelihood of failing.

According to some embodiments, a fluidic diode has no moving parts, rather, differential fluid friction results from the shape of the internal fluid pathway and/or the size of the inlet and outlet. The result is a valve with no moving parts that provides a high resistance to flow in a first direction and a low resistance to flow in a second direction. According to some embodiments, the pressure drop caused by the fluidic diode in a first direction is on the order of 1.5 times as great as the pressure drop caused by the fluidic diode in the second direction, or two times as great, or five times as great, or ten times as great, or more. In some embodiments, the fluidic diode resists flow from the cold leg 112 to the hot leg 110 across the bypass flowpath 118. The fluidic diode 302 may allow fluid flow from the hot leg 110 to the cold leg 112 through the air heat exchanger 116 with significantly less resistance than fluid flow in the opposing direction.

Figure 4:
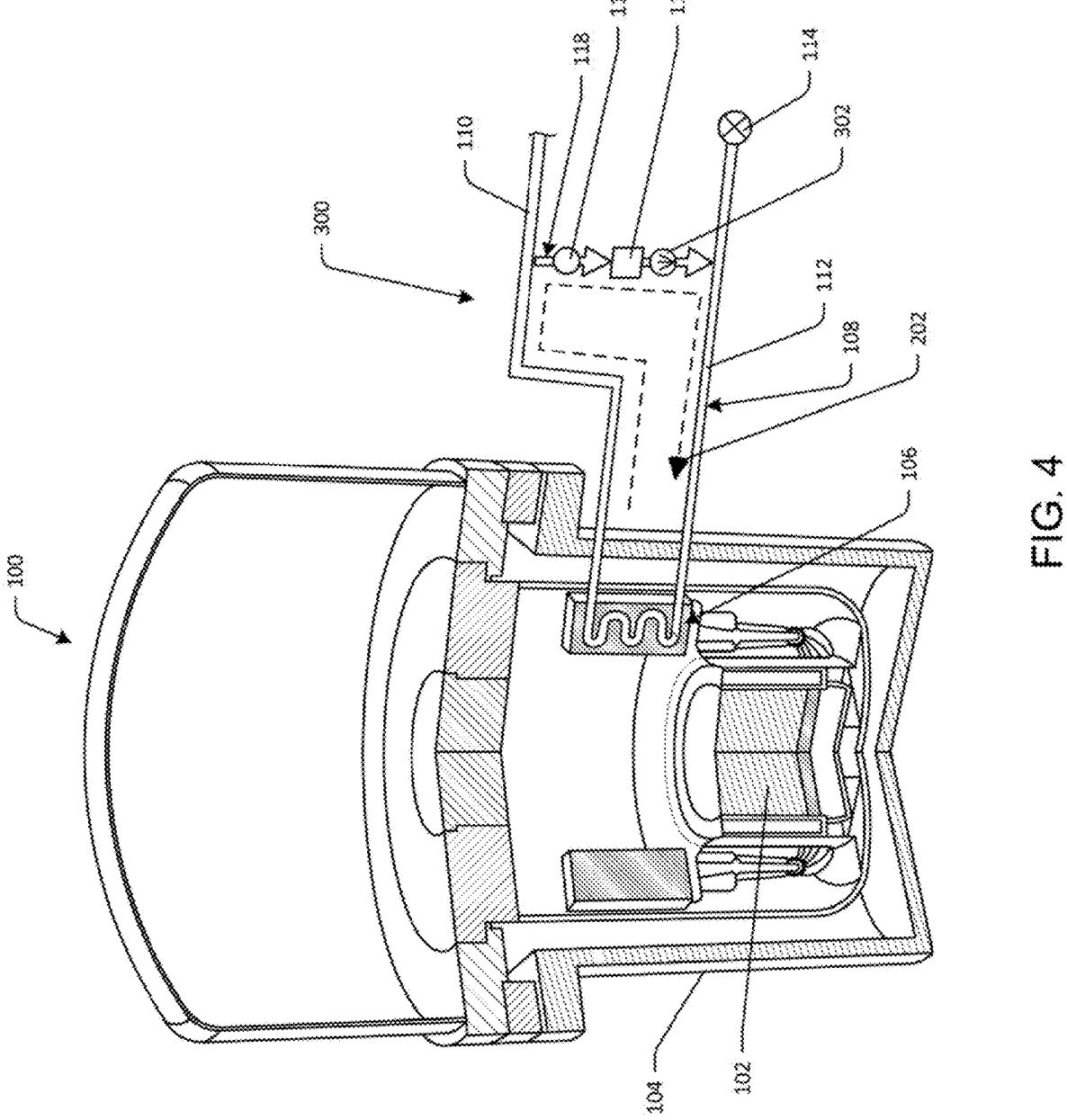
FIG. 4 illustrates a schematic representation of a nuclear reactor intermediate coolant loop incorporating a fluidic diode in a natural circulation operating condition, in accordance with some embodiments.

FIG. 4 illustrates a nuclear reactor intermediate coolant loop 300 with a fluidic diode 302 incorporated to provide preferential flow resistance. As illustrated, when the intermediate pump 114 is not pumping to pressurize the intermediate coolant loop 300, the intermediate coolant fluid may flow in the direction indicated by the arrow 202, by natural circulation. In this configuration, fluid from the hot leg 110 will naturally flow through the air heat exchanger 116, through the fluidic diode 302, and to the cold leg 112.

There are situations where it is desirable to vent the reactor generated heat rather than send the thermal energy to its intended destination, such as a power cycle, or thermal storage. For instance, during reactor startup, the air heat exchanger 116 may be utilized to dump the generated thermal energy until the reactor reaches a threshold operating power. For example, during reactor startup, the intermediate coolant may flow through the air heat exchanger 116 as the reactor ramps up in power, and in some cases, the air heat exchanger is utilized to dump the reactor generated heat during a low-power operating condition, such as, for example, until the reactor reaches 3% power, or 4%, power, or 5% power, or 7% power, or 8% power, or 10% power or more. As the reactor gradually ramps up in power after startup, the heat transfer can gradually be transferred to the primary heat transport structures and the air heat exchanger 116 may be substantially idle once the reactor reaches a threshold power output.

Similarly, during reactor shutdown, the air heat exchanger 116 may be used to dump thermal energy and cool the reactor as it is shutting down during a low-power operating condition. For instance, as the reactor reduces to about 20% power output, the intermediate coolant loop may begin flowing intermediate coolant through the air heat exchanger 116 to dump excess heat. As the reactor continues to reduce in power output below about 20%, the heat transfer duties may be handed off to the air heat exchanger 116 commensurately, so that once the reactor reaches about 5% power during a shutdown, the air heat exchanger 116 is handling 100% of the decay heat. The air heat exchanger 116 can safely handle the decay heat removal from the reactor during a shutdown in a passive mode, with no moving parts, and no required intervention to activate any systems, valves, or pumps.

In some embodiments, the air heat exchanger 116 receives thermal energy in response to reactor power output. For example, on startup, the air heat exchanger 116 initially receives 100% of the thermal energy produced by the reactor until the reactor reaches a threshold power output, such as, for example, about 5% power output. At this point, the air heat exchanger 116 begins gradually passing the thermal energy to the normal thermal management systems, such as through activation of the intermediate coolant pump 114, until the reactor reaches another threshold power output and the entirety of the thermal energy is passed over to the thermal management systems. In many cases, the fluidic diode 302 constrains fluid flow asymmetrically between a first flow direction and a second flow direction, thus inhibiting flow in the first direction when the intermediate coolant loop is pressurized and the nuclear reactor is operating at maximum power output, and allowing flow in the second direction during low reactor power output scenarios, such as startup and/or shutdown. In some cases, fluid flow in the second direction is substantially unrestricted as compared with fluid flow in the first direction.

In some examples, the intermediate coolant is sodium and the primary heat exchanger is a sodium/sodium heat exchanger. In some examples, the intermediate coolant is salt and the primary heat exchanger is a sodium/salt heat exchanger. Of course, these configurations rely on a nuclear reactor that utilizes sodium as a primary coolant and other primary coolants are equally applicable with the disclosed systems and configurations.

The disclosure sets forth example embodiments and, as such, is not intended to limit the scope of embodiments of the disclosure and the appended claims in any way. Embodiments have been described above with the aid of functional building blocks illustrating the implementation of specified components, functions, and relationships thereof. The boundaries of these functional building blocks have been arbitrarily defined herein for the convenience of the description. Alternate boundaries can be defined to the extent that the specified functions and relationships thereof are appropriately performed.

The foregoing description of specific embodiments will so fully reveal the general nature of embodiments of the disclosure that others can, by applying knowledge of those of ordinary skill in the art, readily modify and/or adapt for various applications such specific embodiments, without undue experimentation, without departing from the general concept of embodiments of the disclosure. Therefore, such adaptation and modifications are intended to be within the meaning and range of equivalents of the disclosed embodiments, based on the teaching and guidance presented herein. The phraseology or terminology herein is for the purpose of description and not of limitation, such that the terminology or phraseology of the specification is to be interpreted by persons of ordinary skill in the relevant art in light of the teachings and guidance presented herein.

The breadth and scope of embodiments of the disclosure should not be limited by any of the above-described example embodiments, but should be defined only in accordance with the following claims and their equivalents.

Throughout the instant specification, the term "substantially" in reference to a given parameter, property, or condition may mean and include to a degree that one of ordinary skill in the art would understand that the given parameter, property, or condition is met with a small degree of variance, such as within acceptable tolerances. By way of example, depending on the particular parameter, property, or condition that is substantially met, the parameter, property, or condition may be at least approximately 90% met, at least approximately 95% met, or even at least approximately 99% met.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language generally is not intended to imply that features, elements, and/or operations are in any way required for one or more implementations or that one or more implementations necessarily include logic for deciding, with or without user input or prompting, whether these features, elements, and/or operations are included or are to be performed in any particular implementation.

The specification and drawings disclose examples of systems, apparatus, devices, and techniques that may allow modules of a nuclear reactor to be fabricated in a manufacturing facility and shipped to a construction site, where the modules can be assembled, thereby greatly reducing on-site fabrication complexity and cost. Further, the systems of the nuclear reactor have been simplified and further promote factory fabrication in lieu of on-site fabrication.

A person of ordinary skill in the art will recognize that any process or method disclosed herein can be modified in many ways. The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed.

The various exemplary methods described and/or illustrated herein may also omit one or more of the steps described or illustrated herein or comprise additional steps in addition to those disclosed. Further, a step of any method as disclosed herein can be combined with any one or more steps of any other method as disclosed herein.

It is, of course, not possible to describe every conceivable combination of elements and/or methods for purposes of describing the various features of the disclosure, but those of ordinary skill in the art recognize that many further combinations and permutations of the disclosed features are possible. Accordingly, various modifications may be made to the disclosure without departing from the scope or spirit thereof. Further, other embodiments of the disclosure may be apparent from consideration of the specification and annexed drawings, and practice of disclosed embodiments as presented herein. Examples put forward in the specification and annexed drawings should be considered, in all respects, as illustrative and not restrictive. Although specific terms are employed herein, they are used in a generic and descriptive sense only, and not used for purposes of limitation.

Unless otherwise noted, the terms "connected to" and "coupled to" (and their derivatives), as used in the specification, are to be construed as permitting both direct and indirect (i.e., via other elements or components) connection. In addition, the terms "a" or "an," as used in the specification, are to be construed as meaning "at least one of." Finally, for ease of use, the terms "including" and "having" (and their derivatives), as used in the specification, are interchangeable with and have the same meaning as the word "comprising."

From the foregoing, and the accompanying drawings, it will be appreciated that, although specific implementations have been described herein for purposes of illustration, various modifications may be made without deviating from the spirit and scope of the appended claims and the elements recited therein. In addition, while certain aspects are presented below in certain claim forms, the inventors contemplate the various aspects in any available claim form. For example, while only some aspects may currently be recited as being embodied in a particular configuration, other aspects may likewise be so embodied. Various modifications and changes may be made as would be obvious to a person skilled in the art having the benefit of this disclosure. It is intended to embrace all such modifications and changes and, accordingly, the above description is to be regarded in an illustrative rather than a restrictive sense.

What is claimed is:

1. A nuclear reactor, comprising:
a reactor vessel;
a reactor core within the reactor vessel;
a primary heat exchanger within the reactor vessel;
a coolant loop configured to circulate coolant through the primary heat exchanger, the coolant loop having a hot leg and a cold leg through which coolant flows;
a pump in fluid communication with the coolant loop and configured to circulate coolant through the coolant loop; and
a decay heat removal system, comprising:
a secondary heat exchanger disposed along a bypass flowpath between the hot leg and the cold leg of the coolant loop; and
a fluidic diode disposed along the bypass flowpath to asymmetrically restrict fluid flow of the coolant along the bypass flowpath and configured to allow natural circulation of the coolant along the bypass flowpath to remove decay heat from the reactor core, wherein the fluidic diode is configured to provide a flow resistance against the pump circulating the coolant across the bypass flowpath; and wherein the fluidic diode comprises no moving parts and is configured to passively provide differential flow resistance based solely on flow direction through fixed geometry of the fluidic diode.

2. The nuclear reactor as in claim 1, wherein the fluidic diode is disposed outside the reactor vessel.

3. The nuclear reactor as in claim 1, wherein the secondary heat exchanger is an air heat exchanger.

4. The nuclear reactor as in claim 1, wherein the fluidic diode is configured to allow a relatively unrestricted fluid flow across the bypass flowpath when the pump is not operating.

5. The nuclear reactor as in claim 1, wherein the secondary heat exchanger is configured to dump reactor output heat during a low-power startup operating condition.

6. The nuclear reactor as in claim 1, wherein the secondary heat exchanger is configured to dump reactor output heat during a low-power shutdown operating condition.

7. The nuclear reactor as in claim 1, wherein the coolant is sodium.

8. The nuclear reactor as in claim 1, wherein the coolant is salt.

9. The nuclear reactor as in claim 1, further comprising a bypass flow pump configured to cause coolant to flow along the bypass flowpath.

10. The nuclear reactor as in claim 1, wherein the fluidic diode is configured to provide greater than five times more flow restriction to fluid flowing in a first direction as compared with fluid flowing in a second direction.

11. A method of operating the nuclear reactor of claim 1, wherein the coolant is an intermediate coolant and the coolant loop is an intermediate coolant loop, comprising:

generating heat in the reactor core of the nuclear reactor;

causing a primary coolant to flow within the nuclear reactor through the primary heat exchanger;

causing the intermediate coolant to flow through the intermediate coolant loop and through the primary heat exchanger to absorb heat from the primary coolant;

causing the intermediate coolant to flow through the bypass flowpath; and dumping heat, during a period of low reactor power, from the heat exchanger disposed along the bypass flowpath in the intermediate coolant loop.

12. The method of operating the nuclear reactor as in claim 11, further comprising continuing to dump heat from the heat exchanger disposed along the bypass flowpath until the nuclear reactor reaches a target threshold power output.

13. The method of operating the nuclear reactor as in claim 12, further comprising diverting a portion of the intermediate coolant away from the bypass flowpath as the nuclear reactor exceeds the target threshold power output.

14. The method of operating the nuclear reactor as in claim 11, wherein causing the intermediate coolant to flow through a bypass flowpath further comprises causing the intermediate coolant to flow through the fluidic diode in fluid communication with the bypass flowpath.

15. The method of operating the nuclear reactor as in claim 11, wherein the period of low reactor power is less than about 5% reactor power.

16. The method of operating the nuclear reactor as in claim 11, wherein the period of low reactor power is less than about 20% reactor power.

17. The method of operating the nuclear reactor as in claim 11, wherein the period of low reactor power occurs as the nuclear reactor is shutting down.

18. The method of operating the nuclear reactor as in claim 17, wherein the step of dumping heat comprises dumping decay heat from the nuclear reactor during a reactor shut down cycle.

19. The method of operating the nuclear reactor as in claim 11, wherein causing the intermediate coolant to flow comprises causing sodium to flow through the intermediate cooling loop.

20. The method of operating the nuclear reactor as in claim 11, wherein causing the intermediate coolant to flow comprises causing salt to flow through the intermediate cooling loop.

* * * * *